(12) United States Patent
Chalin

(10) Patent No.: US 7,717,442 B2
(45) Date of Patent: May 18, 2010

(54) SUSPENSION SYSTEM HAVING HIGH STRENGTH ARM TO AXLE CONNECTION

(75) Inventor: Thomas N. Chalin, Fairview, TX (US)

(73) Assignee: Watson & Chalin Manufactuing, Inc., McKinney, TX (US)

( * ) Notice: Subject to any disclaimer, the term of this patent is extended or adjusted under 35 U.S.C. 154(b) by 0 days.

(21) Appl. No.: 11/861,210

(22) Filed: Sep. 25, 2007

(65) Prior Publication Data

US 2008/0007024 A1 Jan. 10, 2008

Related U.S. Application Data

(63) Continuation of application No. 11/000,810, filed on Dec. 1, 2004, now abandoned.

(51) Int. Cl.
*B60G 9/00* (2006.01)

(52) U.S. Cl. .............................................. 280/124.116

(58) Field of Classification Search .......... 280/124.116, 280/124.11, 124.128, 124.132, 86.5
See application file for complete search history.

(56) References Cited

U.S. PATENT DOCUMENTS

| | | | |
|---|---|---|---|
| 2,913,252 A | 11/1959 | Norrie | |
| 4,166,640 A | 9/1979 | VanDenberg | |
| RE30,308 E | 6/1980 | Masser | |
| 4,615,539 A | 10/1986 | Pierce | |
| 4,693,486 A | 9/1987 | Pierce et al. | |
| 5,037,126 A | 8/1991 | Gottschalk et al. | |
| 5,116,075 A | 5/1992 | Pierce et al. | |
| 5,230,528 A | 7/1993 | Van Raden et al. | |
| 5,366,237 A | 11/1994 | Dilling et al. | |
| 5,375,871 A | 12/1994 | Mitchell et al. | |
| 5,476,251 A | 12/1995 | Moses | |
| 5,505,481 A | 4/1996 | VanDenberg et al. | |
| 5,634,655 A | 6/1997 | Chalin | |

(Continued)

FOREIGN PATENT DOCUMENTS

| | | |
|---|---|---|
| EP | 0240649 | 10/1987 |
| EP | 0863060 | 9/1998 |

OTHER PUBLICATIONS

Detroit Steel Products advertisement of "Spraxle," undated.

(Continued)

*Primary Examiner*—Eric Culbreth
(74) *Attorney, Agent, or Firm*—Smith IP Services, P.C.

(57) ABSTRACT

A suspension system includes a laterally extending axle and an arm assembly welded to the axle. The arm assembly includes a longitudinally extending arm body having top and bottom surfaces, an axle connector welded to the axle and an end of the arm body, and a plate extending longitudinally over and welded to the arm body top surface, wrapped rearwardly about and welded to the axle connector, and extending longitudinally over and welded to the arm body bottom surface. A method includes the steps of welding an axle connector to an axle; welding a plate to the axle connector, the plate being wrapped rearwardly about the axle connector; and welding an arm body to the axle connector and to the plate, the arm body having top and bottom surfaces, and the plate being welded to each of the top and bottom surfaces.

8 Claims, 4 Drawing Sheets

U.S. PATENT DOCUMENTS

| | | | |
|---|---|---|---|
| 5,690,353 | A | 11/1997 | Vandenberg |
| 5,845,919 | A | 12/1998 | VanDenberg |
| 5,954,351 | A | 9/1999 | Koshinat |
| 5,988,672 | A | 11/1999 | VanDenberg |
| 6,039,336 | A | 3/2000 | Frey |
| 6,209,895 | B1 | 4/2001 | Mueller et al. |
| 6,241,266 | B1 | 6/2001 | Smith et al. |
| 6,491,314 | B2 | 12/2002 | Smith et al. |
| 6,508,393 | B2 | 1/2003 | Chalin |
| 6,557,875 | B2 | 5/2003 | Schlosser |
| 6,641,156 | B1 | 11/2003 | Barlas et al. |
| 6,733,020 | B2 | 5/2004 | Reineck |
| 7,207,583 | B2 * | 4/2007 | Ross et al. ............ 280/124.121 |
| 2001/0013676 | A1 | 8/2001 | Reast |
| 2001/0020775 | A1 | 9/2001 | Pierce et al. |
| 2003/0067134 | A1 | 4/2003 | Galazin |
| 2003/0146592 | A1 | 8/2003 | Chalin et al. |
| 2004/0080132 | A1 | 4/2004 | Chan et al. |
| 2004/0100060 | A1 | 5/2004 | Reast |
| 2004/0256829 | A1 | 12/2004 | Chalin |

OTHER PUBLICATIONS

Grewell, Benatar, and Park. Plastics and Composites Welding Handbook. Hanser Gardner Publications, Inc., May 2003.

Smith, "Prepare to Win," drawing entitled "Finger Plate Reinforcement for Tube Junction with Weld in Tension." Fig. 29, (ISBN 978-0-9651600-3-2) 1975.

Official Action issued Nov. 22, 2007, by the Canadian Intellectual Property Office for Canadian Patent Application No. 2,526,787, 3 pages.

Canadian Office Action issued Jan. 22, 2009, for Canadian Patent Application Serial No. 2,526,787, 4 pages.

* cited by examiner

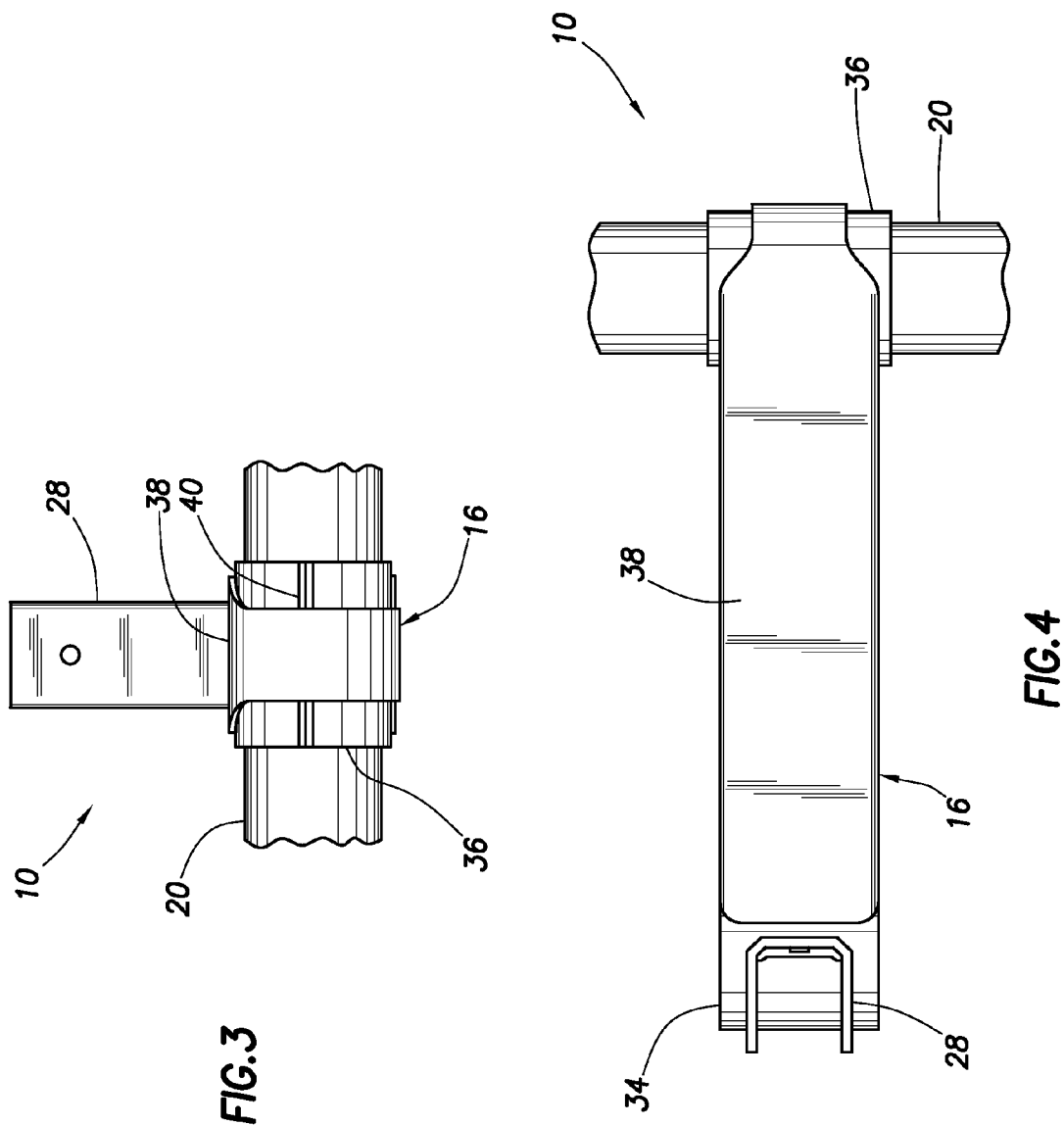

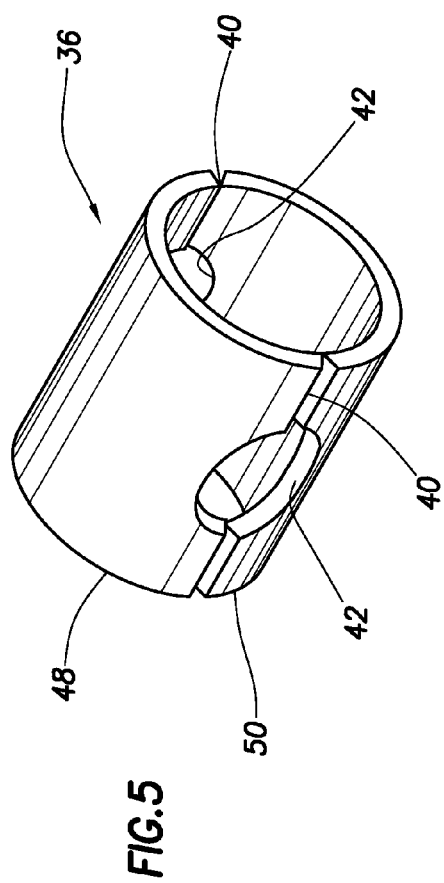
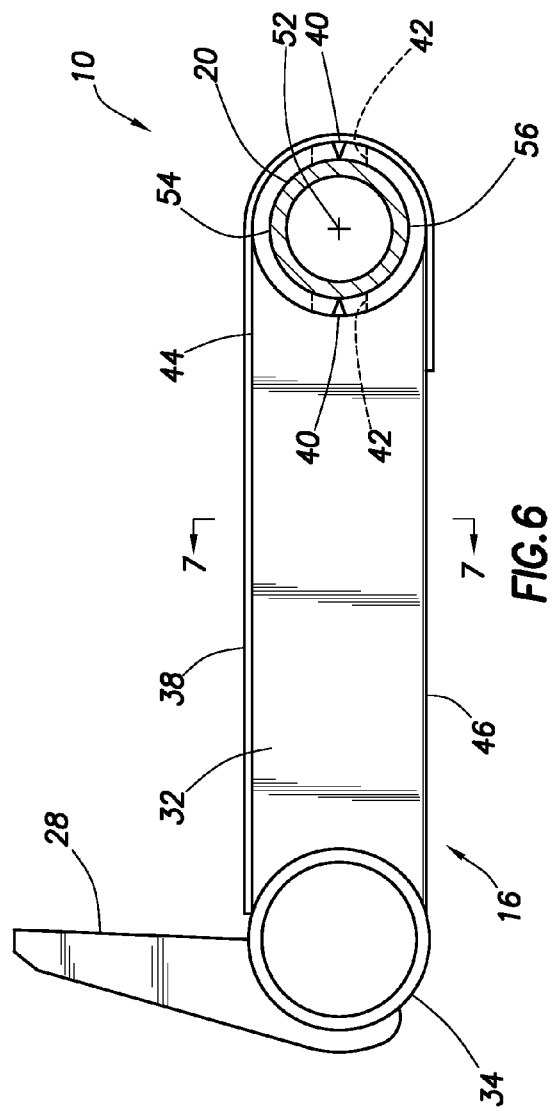

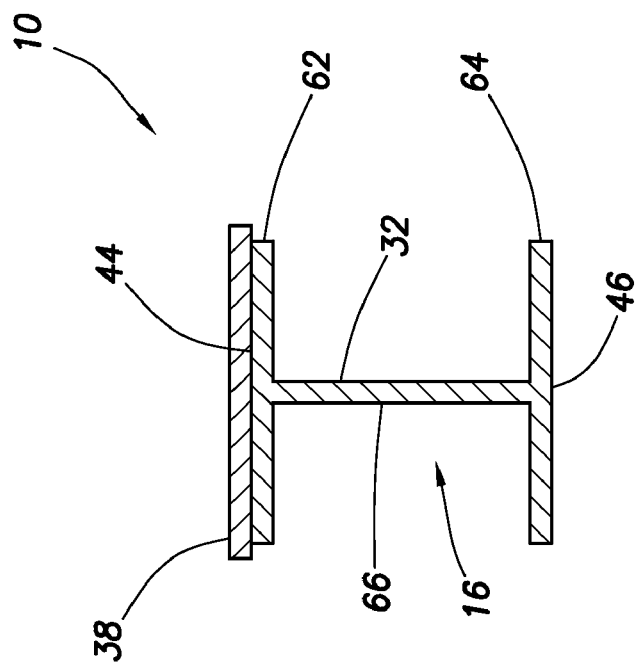
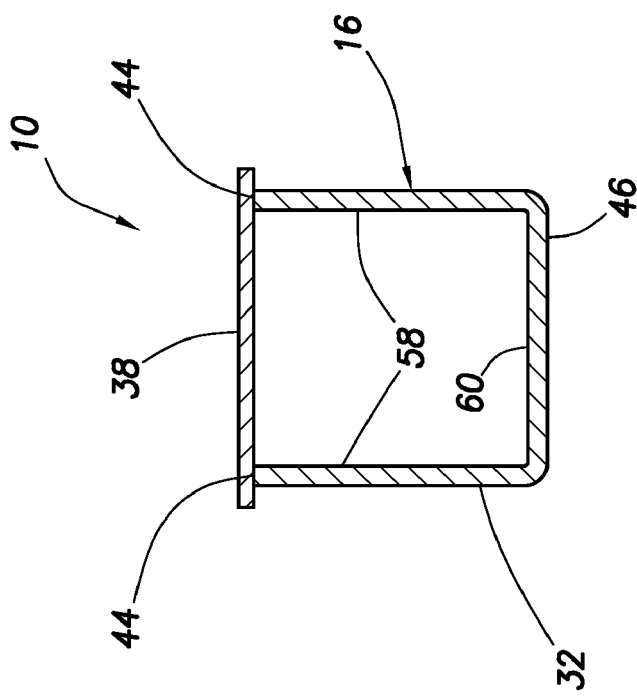

SUSPENSION SYSTEM HAVING HIGH STRENGTH ARM TO AXLE CONNECTION

CROSS-REFERENCE TO RELATED APPLICATION

The present application is a continuation under 35 USC 120 of prior application no. Ser. No. 11/000,810 filed Dec. 1, 2004 now abandoned. The entire disclosure of this prior application is incorporated herein by this reference.

BACKGROUND

The present invention relates generally to vehicle suspension systems and, in an embodiment described herein, more particularly provides a suspension system having a high strength arm to axle connection.

In the vehicle suspension system art, it is increasingly important to reduce the weight and cost of manufacturing of a suspension system, while maintaining load carrying capacity and increasing functionality. To this end, many configurations of suspension systems and methods of manufacturing suspension systems have been developed. However, improvements are made in at least one of the goals of reducing weight and cost, or maintaining load carrying capacity and increasing functionality, but not both.

Therefore, it may be seen that improvements exist in the art of vehicle suspension systems, but are not completely satisfactory.

SUMMARY

In carrying out the principles of the present invention, in accordance with one of multiple examples described below, a suspension system is provided which accomplishes all of the objectives discussed above.

In one aspect of the invention, a suspension system is provided which includes a laterally extending axle and an arm assembly welded to the axle. The arm assembly includes a longitudinally extending arm body having top and bottom surfaces, an axle connector welded to the axle and an end of the arm body, and a plate extending longitudinally over and welded to the arm body top surface, wrapped rearwardly about and welded to the axle connector, and extending longitudinally over and welded to the arm body bottom surface.

In another aspect of the invention, a method of constructing a suspension system is provided. The method includes the steps of welding an axle connector to an axle; welding a plate to the axle connector, the plate being wrapped rearwardly about the axle connector; and welding an arm body to the axle connector and to the plate, the arm body having top and bottom surfaces, and the plate being welded to each of the top and bottom surfaces.

These and other features, advantages, benefits and objects of the present invention will become apparent to one of ordinary skill in the art upon careful consideration of the detailed description of representative embodiments of the invention hereinbelow and the accompanying drawings.

BRIEF DESCRIPTION OF THE DRAWINGS

FIG. 3 is a rear view of the arm assembly;

FIG. 4 is a top plan view of the arm assembly;

FIG. 5 is an isometric view of an axle connector used in the arm assembly;

FIG. 6 is a side view of the arm assembly;

FIG. 7 is a schematic cross-sectional view of the arm assembly, taken along line 7-7 of FIG. 6; and FIG. 8 is a schematic cross-sectional view of an alternate construction of the arm assembly.

DETAILED DESCRIPTION

Figure 1:
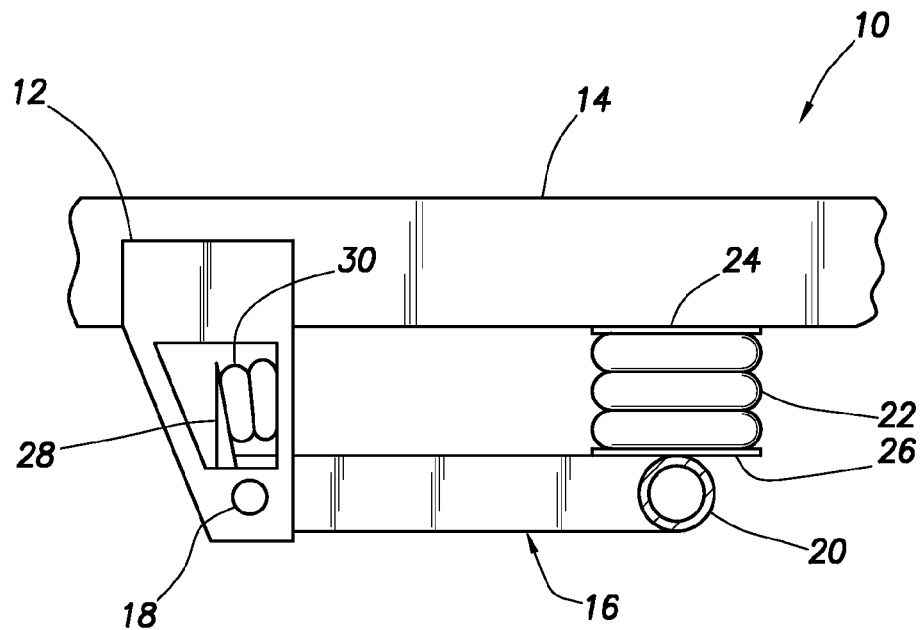
FIG. 1 is a schematic side elevational view of a suspension system embodying principles of the present invention.

Representatively illustrated in FIG. 1 is a suspension system 10 which embodies principles of the present invention. In the following description of the suspension system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

As depicted in FIG. 1, a hanger bracket 12 is attached to a vehicle frame rail 14. An arm assembly 16 is pivotably connected to the hanger bracket 12 at a pivot connection 18. An axle 20 is attached at an end of the arm assembly 16 opposite the pivot connection 18.

An air spring 22 is connected between the frame rail 14 and the arm assembly 16, for example, using a mounting plate 24 attached to the frame rail and another mounting plate 26 attached to a rear end of the arm assembly. The air spring 22 functions to suspend the frame rail 14 above the arm assembly 16 with some compliance for traversing bumps and dips in a road surface. A rubber spring could be used as well as the air spring 22.

A lever arm 28 is attached to a forward end of the arm assembly 16. An axle lift actuator 30 is connected between the lever arm 28 and the hanger bracket 12. The actuator 30 functions to lift the axle 20 relative to the road surface when the actuator 30 is expanded by applying air pressure to the actuator 30 and exhausting air pressure from the actuator 22.

Certain elements are not shown in FIG. 1 for illustrative clarity. For example, wheels, tires, brake components, shock absorbers, steering mechanisms, etc. are not shown, but a person skilled in the art will appreciate how these elements would be used in the suspension system 10. Only one suspension system 10 is depicted in FIG. 1, but it should be understood that typically another suspension system would be attached to another frame rail laterally spaced apart from the frame rail 14 shown in FIG. 1.

The suspension system 10 illustrated in FIG. 1 is of the type known to those skilled in the art as a lift axle air ride trailing arm suspension system. However, it should be understood that it is not necessary for a suspension system constructed using the principles of the invention to be a lift axle suspension system, an air ride suspension system, or a trailing arm suspension system. The suspension system 10 can also be steerable or non-steerable.

Only one arm assembly 16 is depicted in FIG. 1. However, any number of arm assemblies could be used. For example, two arm assemblies 16 could be used in a suspension system.

If the suspension system 10 is a lift axle suspension system as depicted in FIG. 1, the actuator 30 can be positioned other than between the lever arm 28 and hanger bracket 12. For example, the actuator 30 could be connected between the lever arm 28 and a bracket separately attached to the frame rail 14, between the lever arm 28 and another lever arm on another arm assembly, or in any other position.

In this description, the term "longitudinal" is used to indicate the direction parallel to the length of the frame rail 14, that is, between the forward and rear ends of the vehicle. The term "lateral" is used to indicate the direction orthogonal to the longitudinal direction in a horizontal plane, that is, from side to side of the vehicle.

Figure 2:
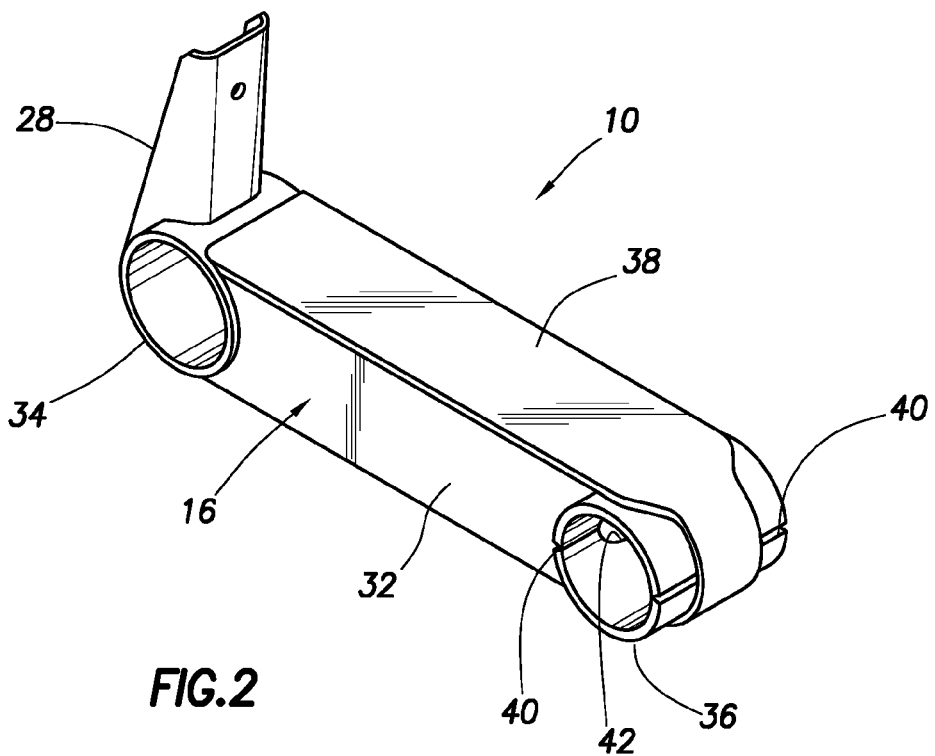
FIG. 2 is an enlarged scale isometric view of an arm assembly used in the suspension system of FIG. 1.

Referring additionally now to FIG. 2, the arm assembly 16 is depicted in more detail apart from the remainder of the suspension system 10. In this view it may be seen that the arm assembly 16 includes a longitudinally extending arm body 32, a pivot connection sleeve 34 attached at a forward end of the arm body, the lever arm 28 attached to the sleeve, an axle connector 36 attached at a rear end of the arm body, and a plate 38 attached to the sleeve, axle connector and arm body.

Preferably, each of the attachments described above is accomplished by welding. In one method of constructing the arm assembly 16, the axle connector 36 is welded to the axle 20, but the arm assembly is not welded directly to the axle. The plate 38 is then wrapped rearwardly about the axle connector 36 and welded to the axle connector. The arm body 32 is welded to the plate 38 and the axle connector 36. The sleeve 34 is also welded to the plate 38 and to the arm body 32. The lever arm 28 is welded to the sleeve 34 if the suspension system 10 is a lift axle suspension system.

The sleeve 34 is configured to receive a resilient pivot bushing (not shown) therein of the type well known to those skilled in the art as being used in pivot connections, such as the pivot connection 18. The axle connector 36 is configured to receive the axle 20 therein.

Referring additionally now to FIG. 3, a rear view of the arm assembly 16 is depicted with the axle 20 received in the axle connector 36. In this view, the manner in which the plate 38 wraps rearwardly about the axle connector 36 may be clearly seen.

Note that the plate 38 overlies a seam 40 of the axle connector 36. As will be described in further detail below, the plate 38 also overlies an opening 42 formed in the axle connector 36 at the rear seam 40.

Referring additionally now to FIG. 4, a top view of the arm assembly 16 is depicted. In this view, the relative longitudinal positionings of the sleeve 34, plate 38 and axle connector 36 may be seen. As described above, the plate 38 is welded to both the sleeve 34 and the axle connector 36.

Referring additionally now to FIG. 5, the axle connector 36 is illustrated apart from the remainder of the arm assembly 16. In this view it may be seen that the axle connector 36 is divided into two generally semicircular sections 48, 50 by the seams 40 extending laterally across the axle connector. The openings 42 are formed at the seams 42, so that the seams also divide the openings in half.

To attach the axle connector 36 to the axle 20, the sections 48, 50 are first positioned on the axle so that the seams 40 and openings 42 are at positions approximately midway between upper and lower extents 54, 56 of the axle, that is, the seams are located approximately at a horizontal plane intersecting a longitudinal axis 52 of the axle. This positioning is visible in FIG. 6.

When properly positioned, the axle connector 36 is biased into intimate contact with the axle 20, for example, by clamping the sections 48, 50 onto the outer surface of the axle. This removes any voids between the axle connector 36 and the axle 20 prior to welding, thereby strengthening the welded connection.

Alternatively, the axle connector 36 could be constructed as a single piece (i.e., having a continuous circumference), instead of being divided into the separate sections 48, 50. In that case, the axle connector 36 could be pressed onto the axle 20 (the axle connector having an initial inner diameter less than an outer diameter of the axle), such that voids between the axle connector and axle are removed prior to welding. Methods other than press-fitting could be used, such as by heating the axle connector 36 to expand it prior to positioning it on the axle 20 and/or cooling the axle to contract it prior to positioning the axle connector on the axle, etc.

In the illustrated embodiment, the axle connector 36 is welded to the axle 20 along the seams 40 (which also welds the sections 48, 50 to each other) and about the openings 42. Note that, in other embodiments, the sections 48, 50 may be welded to each other along the seams 40 without also welding to the axle 20, so that the axle connector 36 is mainly, or completely, welded to the axle at the openings 42. When the plate 38 is later welded to the axle connector 36, it will overlie the rear seam 40 and opening 42, thereby further strengthening the welded connection.

Also visible in FIG. 6 is the manner in which the plate 38 is attached to both a top surface 44 of the arm body 32 and a bottom surface 46 of the arm body. By welding the plate 38 to the top and bottom surfaces 44, 46 of the arm body 32 at either side of the rearward wrap of the plate about the axle connector 36, the connection between the axle connector and the remainder of the arm assembly 16 is strengthened, providing a relatively light weight assembly which is both capable of carrying substantial loads and economical to manufacture.

Note that various different sequences may be used to weld the plate 38 and the arm body 32 to the axle connector 36. The plate 38 could be welded to the axle connector 36 first, and then the arm body 32 could be welded to the plate and the axle connector. The arm body 32 could be welded to the axle connector 36 first, and then the plate 38 could be welded to the axle connector and the arm body. The plate 38 could be welded to the arm body 32, and then the plate and arm body could be welded to the axle connector 36. Other sequences may be used in keeping with the principles of the invention.

Referring additionally now to FIG. 7, a schematic cross-sectional view of the arm assembly 16 is depicted. In this view, it may be seen that the arm body 32 is a U-shaped channel with two generally vertically extending legs 58 and a generally horizontally extending base 60 connecting lower ends of the legs. The bottom surface 46 of the arm body 32 is formed on the base 60, and the top surface 44 of the arm body is formed on upper ends of the legs 58.

Referring additionally now to FIG. 8, an alternate configuration of the arm body 32 is depicted. In this configuration, the arm body 32 is I-shaped with upper and lower horizontally extending flanges 62, 64 and a vertical web 66 connecting the flanges. The bottom surface 46 of the arm body 32 is formed on the lower flange 64, and the top surface 44 of the arm body is formed on the upper flange 62.

Although U-shaped channel and I-shaped configurations of the arm body 32 have been described, any shape may be used for the arm body in keeping with the principles of the invention. For example, the arm body 32 could be box-shaped, cylindrical, oval, longitudinally curved, laterally curved, etc. A box cross-sectional shape of the arm body 32 could have a rectangular, trapezoidal or other closed rectilinear shape. The shapes described above could be inverted, rotated or otherwise changed in orientation.

Furthermore, although the U-shaped channel depicted in FIG. 7 and the I-shaped configuration depicted in FIG. 8 are each shown as being constructed of a single piece of material, they (or any other configuration of the arm body 32) may in practice be constructed of separate pieces, such as plates, joined to each other by welding or other methods. For example, the arm body having a box cross-sectional shape could include top and bottom plates joined to at least two generally vertical legs, with one of the top and bottom plates overlapping the other after wrapping rearwardly about the axle connector 36. In that case, the top plate would correspond to the top plate 38, the bottom plate would correspond to the horizontal base 60, and the legs would correspond to the legs 58 of the embodiment shown in FIG. 7, except that the top and bottom plates and legs would be separately constructed and then joined to each other.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A suspension system, comprising:
   a laterally extending axle; and
   an arm assembly welded to the axle, the arm assembly including:
      a longitudinally extending metal arm body having first and second surfaces,
      an axle connector welded to the axle and a first end of the metal arm body, and
      a first plate extending longitudinally over and welded to the metal arm body first surface, wrapped rearwardly about and welded to the axle connector, and extending longitudinally over and welded to the metal arm body second surface,
   wherein a pivot connection sleeve is welded to a second end of the arm body opposite the first end, and the first plate is welded to the sleeve.

2. A suspension system, comprising:
   a laterally extending axle; and
   an arm assembly welded to the axle, the arm assembly including:
      a longitudinally extending metal arm body having first and second surfaces,
      an axle connector welded to the axle and a first end of the metal arm body, and
      a first plate extending longitudinally over and welded to the metal arm body first surface, wrapped rearwardly about and welded to the axle connector, and extending longitudinally over and welded to the metal arm body second surface,
   wherein the arm body has a generally U-shaped cross-sectional shape with at least two generally vertically extending legs and a base extending between the legs, and wherein the first plate is welded to the at least two legs and to the base.

3. A suspension system, comprising:
   a laterally extending axle; and
   an arm assembly welded to the axle, the arm assembly including:
      a longitudinally extending metal arm body having first and second surfaces,
      an axle connector welded to the axle and a first end of the metal arm body, and
      a first plate extending longitudinally over and welded to the metal arm body first surface, wrapped rearwardly about and welded to the axle connector, and extending longitudinally over and welded to the metal arm body second surface, the first plate thereby closing off and forming at least one side of the arm body,
   wherein the arm body has a box cross-sectional shape and includes at least two generally vertical legs, and a second plate joined to the legs, the first plate overlapping the second plate.

4. A suspension system, comprising:
   a laterally extending axle; and
   an arm assembly welded to the axle, the arm assembly including:
      a longitudinally extending metal arm body having first and second surfaces,
      an axle connector welded to the axle and an end of the metal arm body, and
      a plate extending longitudinally over and welded to the metal arm body first surface, wrapped rearwardly about and welded to the axle connector, and extending longitudinally over and welded to the metal arm body second surface,
   wherein the arm body has a generally I-shaped cross-sectional shape with upper and lower generally horizontally extending flanges, and wherein the plate is welded to the flanges.

5. A method of constructing a suspension system, the method comprising the steps of:
   welding an axle connector to an axle;
   welding a plate to the axle connector, the plate being wrapped rearwardly about the axle connector;
   welding a metal arm body to the axle connector and to the plate, the metal arm body having first and second surfaces, and the plate being welded to each of the first and second surfaces;
   welding a pivot connection sleeve to the arm body; and
   welding the plate to the sleeve.

6. A method of constructing a suspension system, the method comprising the steps of:
   welding an axle connector to an axle;
   welding a plate to the axle connector, the plate being wrapped rearwardly about the axle connector; and
   welding a metal arm body to the axle connector and to the plate, the metal arm body having first and second surfaces, and the plate being welded to each of the first and second surfaces,
   wherein the arm body has a generally U-shaped cross-sectional shape with at least two generally vertically extending legs and a base extending between the legs, and wherein the plate welding step further comprises welding the plate to the legs and to the base.

7. A method of constructing a suspension system, the method comprising the steps of:
   welding an axle connector to an axle;
   welding a plate to the axle connector, the plate being wrapped rearwardly about the axle connector; and
   welding a metal arm body to the axle connector and to the plate, the metal arm body having first and second surfaces, and the plate being welded to each of the first and second surfaces, the plate thereby closing off and forming at least one side of the arm body,
   wherein the arm body has a box cross-sectional shape and includes at least two generally vertical legs, and a base joined to the legs, and wherein the plate welding step further comprises welding the plate to the legs and to the base.

8. A method of constructing a suspension system, the method comprising the steps of:
welding an axle connector to an axle;
welding a plate to the axle connector, the plate being wrapped rearwardly about the axle connector; and
welding a metal arm body to the axle connector and to the plate, the metal arm body having first and second surfaces, and the plate being welded to each of the first and second surfaces,
wherein the arm body has a generally I-shaped cross-sectional shape with upper and lower generally horizontally extending flanges, and wherein the plate welding step further comprises welding the plate to the flanges.

* * * * *